Patented Nov. 7, 1950

2,529,186

UNITED STATES PATENT OFFICE 2,529,186

PREPARATION OF CINNAMALDEHYDE

Henry H. Richmond, Guelph, Ontario, Canada, assignor to United States Rubber Company, New York, N. Y., a corporation of New Jersey No Drawing. Application April 5, 1947, Serial No. 739,661

3 Claims. (Cl. 260—599)

This invention relates to the preparation of cinnamaldehyde by the alkaline catalyzed condensation of acetaldehyde and benzaldehyde according to the equation

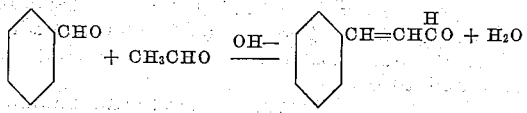

It has been found that a high yield (i. e., on the order of 75–85%, based on the benzaldehyde) of cinnamaldehyde can be obtained by adding the acetaldehyde gradually to the benzaldehyde. A reversal in the order of addition, or the simultaneous mixing, of the reagents results in low yields, i. e., on the order of 18, and 49%, respectively.

Preferably, the reaction is carried out at a moderately elevated temperature such as 70° C., although this reaction temperature may be varied from 60–80° C. without too substantial a loss in yield. As usual in this condensation a dilute alkali catalyst is used, such as sodium hydroxide, potassium hydroxide, lithium hydroxide, trimethyl benzyl ammonium hydroxide, etc. The addition of the acetaldehyde to the benzaldehyde avoids having present at any time an excess of acetaldehyde and thereby minimizes the self-condensation of the acetaldehyde as well as the further condensation of cinnamaldehyde with acetaldehyde.

By condensing a molecular proportion of the acetaldehyde with a slight excess over a molecular proportion of the benzaldehyde, there is maintained throughout, an excess of benzaldehyde which tends to prevent to some extent the formation of high boiling products which may be formed in part if the acetaldehyde were in excess to condense with formed cinnamaldehyde as aforesaid.

The acetaldehyde used in this process may be added as a liquid or a gas or in aqueous solution. Further, it is not necessary that the benzaldehyde be highly purified. Technical grades of benzaldehyde containing small amounts of chlorine may be used, since the chlorine containing impurities are removed in the final fractionation of the cinnamaldehyde. The quality of the cinnamic aldehyde obtained is very good, analyzing as high as 99% pure and is suitable for the preparation of flavors and perfumes.

The pH of the reaction mixture should be maintained by the addition of alkali from time to time in the region of 8 to 12, and especially from 8.3 to 10. This is conveniently done by staying in the pink range of phenolphthalein indicator. The pH of the reaction mixture tends to fall due to the formation of benzoic acid from the benzaldehyde. At the end of the reaction the mixture is slightly acidified to remove the alkali and then is made slightly basic by the addition of sodium bicarbonate. In practice it has been found easier to acidify and then make faintly alkaline with sodium bicarbonate than to reach the same pH by addition of acid; this procedure removes any benzoic acid present.

The unreacted benzaldehyde can be recovered by fractional distillation and in the same fractionation, cinnamaldehyde is obtained in a state of high purity leaving behind high boiling by-products.

The duration of the period of time in which the acetaldehyde is added to the reaction mixture materially affects the yield of cinnamaldehyde obtained. For the batch size and efficient stirring, as set forth in Example 1, the preferred addition time is 90 minutes, although this addition time may be varied from 1 hour to 2 hours without too substantial a loss in yield. When the addition time is lowered from 90 minutes to 20 minutes the yield falls from 81% to 72%. When the addition time is increased from 90 minutes to 3 hours the yield falls from 81% to 68%.

The duration of the period of time subsequent to the addition of the acetaldehyde, and during which the reaction mixture is stirred while maintaining the temperature at 70° C., materially affects the yield of the cinnamaldehyde obtained. For the batch size and efficient stirring described in Example 1, the preferred duration of the period of time subsequent to the addition of the acetaldehyde and during which the reaction mixture is stirred while maintaining the temperature at 70° C., is 90 minutes, although this period of time may be varied from 30 minutes to 3 hours without too substantial a loss in yield. When this period of time is increased to 4 hours the yield falls from 81% to 70%.

The ratio of the total weight of the aqueous alkali medium to the weight of benzaldehyde and acetaldehyde that are condensed, affects the yield obtained and the reaction time, since this factor in addition to the concentration of the alkali in the aqueous medium regulates the ratio of benzaldehyde and acetaldehyde to the hydroxyl ion present which acts as catalyst. The preferred ratio of the weight of aqueous alkali medium to the weight of benzaldehyde and acetaldehyde is 5:1, although the ratio may be varied from 6.5:1 to 2.5:1 without too substantial a loss in yield. Decreasing the reaction volume increases the productivity of the equipment used.

The high boiling by-product which is recovered after the removal of the unreacted benzaldehyde and the cinnamaldehyde is a pleasant smelling oil which is suitable as a masking odorant for such industrial products as rubber.

The following example is given to illustrate the invention.

Example

To a 2000 cc. three-necked flask equipped with a thermometer, a reflux condenser, a stirrer, and a calibrated addition burette, jacketed so that it can be cooled by tap water, and whose tip is inserted below the surface of the reaction mixture, there is introduced 150 g. of technical benzaldehyde and a solution of 3.0 g. of sodium hydroxide in from 500 to 1300, preferably about 1000 cc. of water. The temperature of the mixture is raised, with stirring, to 70° C. The temperature 70° C. is about the optimum temperature for high yields concurrent with the other conditions described in this example but the reaction can be carried out in the range 60–80° C. Maintaining this temperature, 48 grams of acetaldehyde is introduced through the addition burette, uniformly over a period of 1½ hours. This constitutes the period for one-half of the reaction. The alkalinity of the reaction mixture is periodically checked and adjusted so that it is pink to phenolphthalein indicator by the addition of small quantities of sodium hydroxide solution. This acidification is due to the oxidation of benzaldehyde to benzoic acid. The optimum alkalinity is that indicated by the pink color of the phenolphthalein indicator. The stirring is continued for another hour and a half at the same temperature.

The reaction mixture is then acidified to pH 4 with 10% aqueous sulfuric acid solution, and allowed to cool to room temperature; the excess sulfuric acid and any benzoic acid present is neutralized with an excess of sodium bicarbonate bringing the pH to 8. The slightly alkaline mixture is extracted with a water insoluble organic solvent (200 cc. of benzene) and the whole is subsequently poured into a separatory funnel. The organic layer is separated; most of the solvent and all the water is removed by atmospheric flash distillation, and the residue consisting of benzaldehyde, cinnamaldehyde, and high boiling by-products, fractionated in vacuo.

The products are: 63.9 g. benzaldehyde boiling at 63° C. and 15 mm. $n_D=1.546$; 86.9 g. cinnamaldehyde boiling at 123° C. and 15 mm. $n_D=1.622$, and a higher boiling residue of 25 g. This represents a yield of 81% and a conversion of 46%. By analysis the cinnamaldehyde is found to be 99% pure.

While I have shown and described various embodiments of the invention, it is to be understood that the invention is susceptible to other modifications which appear within the spirit of the invention and the scope of the appended claims.

Having thus described my invention, what I claim and desire to protect by Letters Patent is:

1. A method for preparing cinnamaldehyde which consists in heating a mixture of benzaldehyde and aqueous alkali solution of a concentration of from 0.23 to 0.6% by weight at a temperature of from 60 to 80° C. while gradually adding thereto acetaldehyde over a period of time of from one hour to two hours, the amount of benzaldehyde exceeding that molecularly equivalent to the total acetaldehyde employed, thereafter heating the resulting mixture at the same temperature for a period of time of from thirty minutes to three hours, agitating the mixture throughout said heating steps, maintaining the pH of the reaction mixture at from 8.0 to 12 throughout said heating steps, maintaining a molecular excess of benzaldehyde over acetaldehyde in the reaction mixture throughout said heating steps, and recovering cinnamaldehyde from the resulting reaction mixture.

2. The method of claim 1 wherein said cinnamaldehyde is recovered from the reaction mixture and from any benzoic acid present therein by acidifying the reaction mixture, neutralizing the acidified mixture with an excess of sodium bicarbonate and thereby neutralizing any benzoic acid present, and separately recovering cinnamaldehyde and the unreacted benzaldehyde from the resulting mixture by a method including fractional distillation.

3. The process of claim 1 wherein each of said periods of time is substantially 90 minutes, wherein the weight ratio of aqueous alkali medium to benzaldehyde plus acetaldehyde is substantially 5:1 and wherein said temperature is substantially 70° C.

HENRY H. RICHMOND.

REFERENCES CITED

The following references are of record in the file of this patent:

UNITED STATES PATENTS

| Number | Name | Date |
|---|---|---|
| 581,053 | Ach | Apr. 20, 1897 |
| 1,716,822 | Knorr et al. | June 11, 1929 |

FOREIGN PATENTS

| Number | Country | Date |
|---|---|---|
| 163,097 | Japan | Mar. 23, 1944 |